United States Patent

Montgomery

[15] 3,699,273

[45] Oct. 17, 1972

[54] ECHO SUPPRESSION GATE FOR DIGITAL CODE WORDS INCLUDING NOISE INSERTION

[72] Inventor: William Lloyd Montgomery, Little Silver, N.J.

[73] Assignee: Bell Telephone Laboratories, Incorporated, Murray Hill, N.J.

[22] Filed: Dec. 24, 1970

[21] Appl. No.: 101,381

[52] U.S. Cl...............................179/170.2, 178/70 R

[51] Int. Cl...............................................H04b 3/20

[58] Field of Search....179/170.2; 178/70 R; 340/347

[56] References Cited

UNITED STATES PATENTS

| | | | |
|---|---|---|---|
| 3,064,889 | 11/1962 | Hupp | 235/92 CC |
| 3,172,952 | 3/1965 | Lentz | 178/70 R |
| 3,524,938 | 8/1970 | Boxall | 179/15 BS |

*Primary Examiner*—Kathleen H. Claffy
*Assistant Examiner*—William A. Helvestine
*Attorney*—R. J. Guenther, William L. Keefauver and R. J. Guenther

[57] ABSTRACT

Apparatus for suppressing echoes in digital speech transmission systems includes a serial-to-parallel converter, a buffer store and a parallel-to-serial converter. Digital code words propagating in serial form are first converted to parallel code words. The bits of the parallel code words are then supplied to the buffer store. An echo is suppressed by clearing the buffer store of the stored bits of the digital code word representing the echo and supplying logical signals representing substantially a zero amplitude signal to the parallel-to-serial converter. During the suppression of an echo code word, noise is automatically inserted into the transmission facility by allowing the logical signal in at least the last bit of the code word being suppressed to pass unaltered.

10 Claims, 3 Drawing Figures

INVENTOR
W. L. MONTGOMERY
BY T. Stafford
ATTORNEY

ECHO SUPPRESSION GATE FOR DIGITAL CODE WORDS INCLUDING NOISE INSERTION

BACKGROUND OF THE INVENTION

This invention relates to the suppression of echoes in transmission systems and, more particularly, to circuits for suppressing echoes in digital speech transmission systems.

It is well known that echoes occur in telephone circuits when transmitted speech signals in analog form meet imperfections within the transmission facilities and are reflected back along the transmission facility to the subscriber who uttered the speech. Because of the finite time required for the reflected signals to propagate through the transmission facility, they are heard by the speaking subscriber after the original speech has been transmitted. As transmission distances increase, the echoes take longer to reach the speaking subscriber and, hence, become a greater annoyance.

To correct these problems, attempts have been made to control the reflected signals with apparatus commonly known as echo suppressors. Most echo suppressors presently utilized in telephone transmission facilities combat echoes by interrupting the incoming or outgoing signal transmission paths according to a decision based upon relative levels of incoming and outgoing analog signals. Typically, this is achieved by inserting a high impedance into or otherwise open circuiting the particular transmission path. Such suppression techniques have been somewhat satisfactory in analog speech transmission systems. A distinct disadvantage, however, is the requirement that each analog speech transmission channel be serviced by a separate echo suppressor.

Moreover, the suppression techniques utilized in analog speech transmission systems cannot readily be employed in digital speech transmission systems, for example, pulse code modulation (PCM) transmission systems. As is well known, pulse code modulation involves the encoding of analog speech signals and then transmitting that information in the form of digital code words via a time divided transmission facility. In a typical PCM system 24 speech channels are combined for transmission over a single transmission facility. Because of the multiple speech signals being transmitted and other equipment and systems limitations, open circuiting of the transmission path to combat echoes is not feasible. Furthermore, it would be advantageous to suppress echoes in such a system in the digital domain. Then, only one suppression mechanism or circuit would be required to eliminate echoes from each of the 24 digital speech channels, as compared to utilizing a separate echo suppressor for each analog speech channel.

SUMMARY OF THE INVENTION

It is, therefore, a general object of this invention to suppress digital code words representing echoes in digital speech transmission systems.

This and other objects are accomplished, in accordance with this invention, by selectively converting digital code words which represent echo signals to digital code words which represent substantially zero amplitude signals. This is achieved in a digital transmission circuit by substituting logical signals representing zero amplitude for the logical signals of the original echo code word.

More specifically, individual digital code words propagating in serial form, for example PCM code words, are first converted to parallel code words. The bits of the parallel code words are then supplied to a buffer store. When it is determined that a particular stored code word is an echo, suppression is achieved by clearing the buffer store of the logical signals representing the echo and substituting therefore logical signals representative of substantially a zero amplitude signal. The altered parallel code word is then converted to serial form for further transmission. If it is determined that a particular code word does not represent an echo it passes through the suppression circuit unaltered.

Suppression of echoes by substituting zero amplitude signals may cause the subscriber utilizing the telephone facility to believe that it is inoperative. That is to say, the telephone line may appear to be "dead" during those intervals when echoes are being suppressed. This condition may be alleviated by supplying a noise signal to the transmission facility during the suppression intervals. Accordingly, another feature of the invention is the selective insertion of noise into the transmission facility during echo suppression intervals. This is achieved, in accordance with the invention, by allowing the logical signal in at least a predetermined one of the bits of the digital code words representing echoes to propagate through the digital echo suppression gate unaltered. This technique inserts signals representative of random logical "1s" or logical "0s" into the transmission facility, which represents noise in digital speech transmission systems. If a larger amplitude noise signal is desired the logical signals in more than one of the echo code word bits are allowed to pass through the suppression circuit unaltered.

BRIEF DESCRIPTION OF THE FIGS.

These and other objects and advantages of the invention will be more fully understood from the following detailed description taken in connection with the appended drawings wherein.

DETAILED DESCRIPTION

Digital transmission of speech signals involves the conversion of analog speech signals into digital code words. For this purpose, numerous code schemes have been devised using code words having any number of digits. For example, code schemes using seven digit and eight digit code words are well known in the art. Although this invention may be utilized to suppress echoes in digital speech transmission systems employing code words having any number of digits, for simplicity and clarity of description, the present invention is hereafter described in a system which utilizes eight digit code words.

One such code scheme, commonly referred to as the mu-law code, is used in pulse code modulation (PCM) speech transmission systems. Each of the eight digit code words employed in the mu-law code includes a sign bit S, segment bits A, B and C and position bits W, X, Y and Z. For purposes of describing this invention it is sufficient to state that in PCM systems which presently utilize the mu-law code, zero amplitude is represented by a code word having a logical "1" in each of its eight bits, namely 11111111. A more detailed description of the mu-law PCM code scheme may be found in my copending application Ser. No. 38,930 filed May 20, 1970, and in an article by H. Kaneko entitled "A Unified Formulation of Segment Companding Laws and Synthesis of Codecs and Digital Compandors," *The Bell System Technical Journal*, September 1970, page 1,555.

Figure 2:
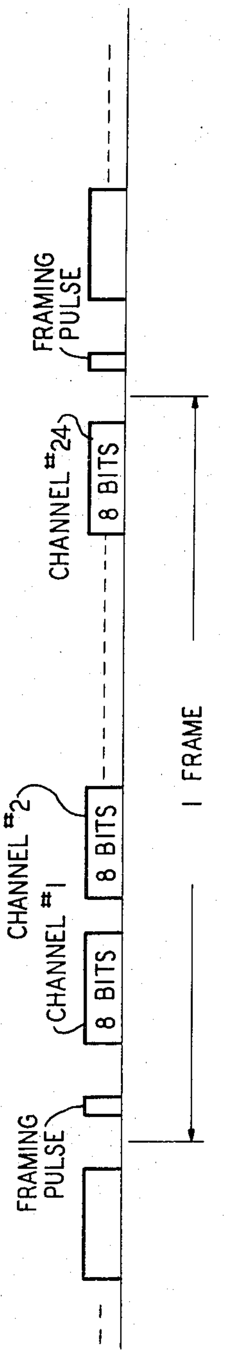
FIG. 2 is a graphical representation of a PCM signal useful in describing the operation of the invention.

Typically, 24 eight digit code words each representing signals propagating through a separate speech channel, are grouped into what is known as a "frame" for transmission over a time divided transmission facility. The individual frames are separated by a pulse signal commonly referred to as a framing bit. FIG. 2 illustrates in simplified form one frame of a PCM signal.

Figure 1:
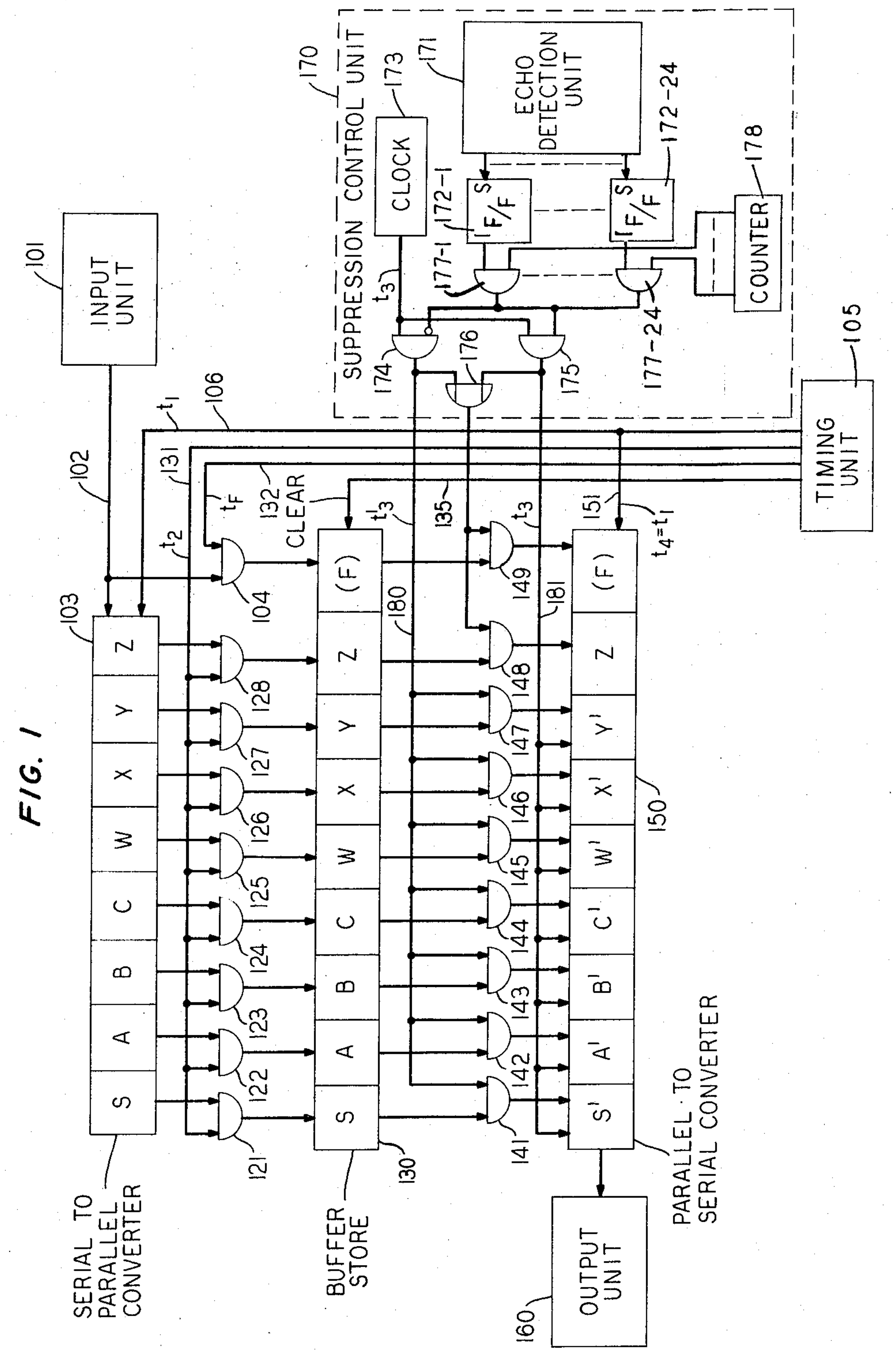
FIG. 1 depicts a suppression gate illustrating the invention.

FIG. 1 depicts in simplified form a circuit, illustrating the principles of the invention, which may be utilized for suppressing echoes in digital speech transmission systems. Digital code words representing speech signals are supplied from input unit 101 via circuit path 102 to shift-register 103 and to one input of AND gate 104. Input unit 101 may be any one of several transmission facilities utilized in digital speech transmission systems. For example, existing pulse code modulation (PCM) systems employ so-called channel banks for converting analog speech signals into digital code words. One such PCM channel bank, commonly known as the D–2 channel bank, utilizes the PCM mu-law code noted above and is described in an article by F. H. Saal entitled "D–2: Another Step Toward Nationwide Digital Transmission," *Bell Laboratories Record*, November 1969, page 327. Shift-register 103 may be any of numerous ones known in the art capable of transferring digital signals at the PCM bit rate of 1.544 million bits per second.

Because of inherent irregularities in analog speech transmission systems, for example, improper impedance matching and the like, portions of speech signals propagating through a transmission system are reflected back along the transmission facility to the telephone subscriber who had uttered the speech. The reflected signals, commonly called echoes, are also converted into code words by input unit 101 (FIG. 1).

Accordingly, digital signals, namely, the S, A, B, C, W, X, Y and Z bits of code words, representative of both echo and non-echo signals, propagating in serial form along circuit path 102 are read into shift-register 103 to be converted into parallel form. Timing signal $t_1$ for shifting the bits of code words to the appropriate stages of shift-register 103 at the PCM bit rate of 1.544 million bits per second is generated in timing unit 105 and supplied via circuit path 106 to shift-register 103. Alternatively, a timing signal for shifting register 103 may be obtained from timing units generally employed in the channel banks of input unit 101. When all of the bits, namely, S, A, B, C, W, X, Y and Z, of a particular code word have been read into register 103, they are then transferred via AND gates 121 through 128 to buffer store 130. AND gates 121 through 128 may be any of those well known in the art which are compatible with the outputs of register 103. AND gate 104 controls the transfer of framing bit F to buffer store 130.

Timing signal $t_2$ for controlling the transfer of the bits of a code word from register 103 to buffer store 130 is generated in timing unit 105 and supplied via circuit path 131 to individual inputs of AND gates 121 through 128. Timing signal $t_F$ for transferring the framing bit to buffer store 130 is also generated in timing unit 105 and supplied via circuit path 132 to an input of AND gate 104.

Suppression control unit 170 generates signals for controlling the transfer of the bits of code words stored in buffer store 130 to shift-register 150 and for controlling the suppression of code words which represent an echo signal. As is well known in the art, a determination of whether or not a particular signal represents an echo is based upon the relative amplitudes of signals propagating on incoming and outgoing transmission lines. For this purpose, a differential detector is used to compare the volume of speech in the two directions of transmission. An echo suppressor utilizing such a detector is described by F. W. Holman and V. P. Suhocki in an article entitled "A New Echo Suppressor", *Bell Laboratories Record*, April 1966, page 139.

Accordingly, in the practice of this invention echo detection unit 171 is supplied with speech signals propagating along incoming and outgoing transmission lines (not shown). Since 24 speech channels are combined for transmission over a single PCM transmission line the code words representing each of the 24 speech channels are scanned in well-known fashion to determine whether or not they represent an echo. If a particular code word is found to represent an echo, echo detection unit 171 generates a signal which is supplied to the "set" input of the flip-flop circuit corresponding to the speech channel in which the echo signal is being propagated, namely, one of flip-flops 172–1 through 172–24. If the particular code word is found not to represent an echo, none of flip-flops 172 are set. The outputs of flip-flops 172–1 through 172–24 are supplied in a one-to-one relationship to a first input of AND gates 177–1 through 177–24. Signals for interrogating each of flip-flops 172 are generated in counter 178 and are supplied to a second input of AND gates 177–1 through 177–24. Each interrogation signal corresponds to an individual speech channel. For example, the signal supplied to the second input of AND gates 177–1 corresponds to channel 1 of the PCM signal (FIG.2), while the signal supplied to the second input of AND gate 177–24 corresponds to channel 24 of the PCM signal. Counter 178 is synchronized with the PCM signal and clock 173 so that the 24 speech channels are sequentially interrogated. In turn, signals developed at the outputs of AND gates 177–1 through 177–24 are supplied at the appropriate instants to an inhibiting input of gate 174 and to one input of AND gate 175. Timing signals generated in clock circuit 173 are supplied to another input of gate 174 and to the second input of AND gate 175. Gate 174 operates to generate a signal representative of a logical "1" when a signal representative of a logical "0" is supplied to its inhibiting input and a signal representative of a logical "1" is supplied to its other input.

Clock circuit 173 generates timing signals at predetermined intervals corresponding to the duration between each of the 24 code words in a frame of the PCM signal. Thus, clock 173, which may be triggered by the framing bit of the PCM code (not shown), generates 24 equally spaced pulse signals during each frame of the PCM signal. Clock 173 is also synchronized with the scanning of the 24 speech channels in echo detection unit 171. That is to say, the signals generated by detection unit 171 for setting flip-flops 172–1 through 172–24 must coincide with the timing signals generated by clock 173.

Thus, when it is determined that a code word in buffer store 130 does not represent an echo, the corresponding one of flip-flops 172–1 through 172–24 is not set to its high state. Accordingly, the associated one of AND gates 177–1 through 177–24 does not respond when interrogated. Hence, the signal developed at the output of that particular one of AND gates 177 corresponding to the particular flip-flop being interrogated remains "low" and a signal representative of a logical "0" is supplied to the inhibiting input of gate 174 and to a first input of AND gate 175. At the appropriate instant, a pulse signal representative of a logical "1" generated by clock 173 is supplied to the other input of gate 174 and to a second input of AND gate 175. In response to the supplied signals, gate 174 generates a signal representative of a logical "1." AND gate 175 does not respond to the supplied signals and its output remains representative of a logical "0." The signal generated by gate 174 is supplied via circuit path 180 to a first input of AND gates 141 through 147 and via OR gate 176 to a first input of AND gates 148 and 149. Signals representative of the non-echo code word stored in the individual stages of buffer store 130 are supplied in a one-to-one relationship to second inputs of AND gates 141 through 149. Accordingly, the non-echo code word is transferred unaltered to shift-register 150.

On the other hand, when it is determined that a particular code word represents an echo, detection unit 171 generates a signal which is supplied to set one of flip-flops 172 which corresponds to the speech channel in which the echo signal is being transmitted. This causes the output of that particular flip-flop to go "-high" and a signal representative of a logical "1" is supplied to one input of the corresponding one of AND gates 177. When that particular AND gate is interrogated, via signals generated in counter 178, a signal representative of a logical "1" is generated. This signal is supplied to the inhibiting input of gate 174, thereby inhibiting its operation, and to a first input of AND gate 175. As in the instance of the non-echo code word, clock 173 generates a pulse signal representative of a logical "1" which is supplied to a second input of AND gate 175. In response to these signals AND gate 175 generates a signal representative of a logical "1" which is supplied via circuit path 181 to selected stages of shift-register 150 and via OR gate 176 to a first input of AND gates 148 and 149.

As noted above, in the mu-law PCM code, zero amplitude may be represented by a code word having a logical "1" in each of its bits. Thus, in accordance with the invention, a signal representative of a logical "1" is substituted via circuit path 181 for the individual S, A, B, C, W, X and Y bits of the echo code word stored in buffer store 130. Signals in the Z bit and framing bit F, however, are allowed to pass into the appropriate stages of shift-register 150 unaltered. Accordingly, a code word represented by 1111111Z is supplied to register 150 in place of the echo code word.

This technique, in addition to generating a code word representing an essentially zero amplitude signal, in accordance with the invention, also inserts random "1s"or "0s" into the PCM transmission facility during the intervals when echo code words are being suppressed. Transmission of random "1s" or "0s" represents noise in digital speech transmission systems. Thus, a so-called apparent "dead-line" condition is alleviated by supplying a noise signal to the transmission facility during suppression intervals. If the amplitude of the noise signal generated by allowing only the Z bit to pass unaltered is found to be insufficient, it may be increased by allowing another bit of the code word to pass unaltered, for example, the Y bit. This is effected by supplying the output of OR gate 176 (FIG. 1) to an input of AND gate 147 in place of the output from gate 174 and eliminating the circuit connection from gate 175 to the Y′ stage of register 150.

Once the unaltered or altered code word has been supplied to shift-register 150, buffer store 130 is cleared. A pulse for clearing buffer store 130 is generated in timing unit 105 and supplied via circuit path 135 to buffer store 130. The transferred code word is then read out of register 150 for propagation in serial form through the PCM transmission facility. A signal for shifting register 150 at the PCM transmission bit rate of 1.544 million bits per second is also generated in timing unit 105 and supplied via circuit path 151 to register 150. The code words then propagate through the PCM facility to output unit 160. Unit 160 may also include channel banks for decoding the PCM signals.

Figure 3:
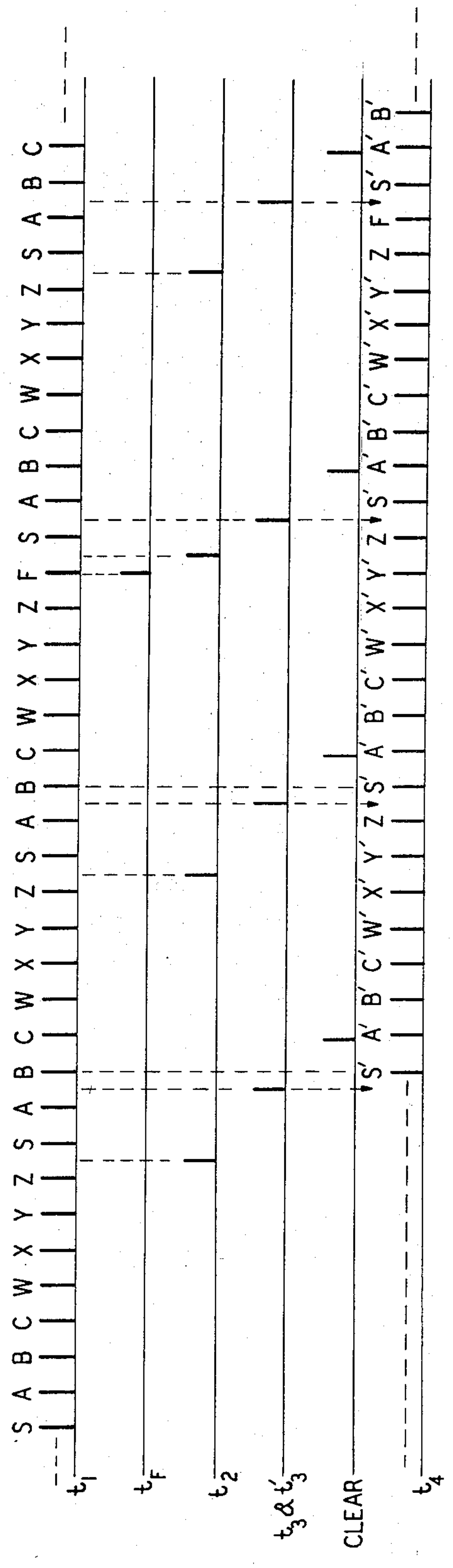
FIG. 3 is a graphical representation of a timing sequence useful in describing the invention.

FIG. 3 shows a sequence of events for propagating digital code words through the digital echo suppression gate of this invention. In operation of the invention, digital code words represented by S, A, B, C, W, X, Y and Z bits are supplied to register 103 (FIG. 1) at the PCM bit rate $t_1$ of 1.544 million bits per second. Once all of the bits of a particular code word have been read into register 103, timing unit 105 generates a pulse at instant $t_2$, (FIG. 3), for transferring the bits of the particular code word to buffer store 130. This transfer occurs during the interval between the Z bit of the transferred code word and the S bit of a subsequent code word. Thus, the next code word propagating in the transmission facility may be read into shift-register 103 without delay. The appropriate one of flip-flops 172 corresponding to the channel of the stored code word being transmitted is then interrogated to determine whether or not the stored word represents an echo. Suppression control unit 170 generates appropriate signals at instants $t_3$ or $t'_3$ (FIG. 3) either for supplying appropriate logical signals to selected stages of register 150 (FIG. 1) to suppress an echo code word or for transferring the bits of the code word in buffer store 130 to the appropriate stages of register 150. Once the bits of the code word have been transferred from buffer store 130 to register 150 or the suppression signals have been supplied to register 150, buffer store 130 is cleared (FIG. 3). Immediately upon their transfer to register 150, the code word bits, namely, S′, A′, B′, C′, W′, X′, Y′ and Z are read out of register 150 at the PCM bit rate of 1.544 million bits per second to be utilized as desired. The above procedure is repeated for all 24 speech channels in each frame of the PCM signal.

Framing bit F which separates the individual frames of the PCM signal is transferred at instant $t_F$ (FIG. 3) into buffer store 130 (FIG. 1). Then framing bit F is transferred from buffer store 130 to register 150 by supplying an appropriate signal from OR gate 176 to an input of AND gate 149 at instant $t_3$ (FIG. 3).

The above-described arrangements are, of course, merely illustrative of the application of the principles of the invention. Numerous other arrangements may be devised by those skilled in the art without departing from the spirit or scope of the invention. For example, logical "0" may be substituted for the echo code word bits in digital systems utilizing a code arrangement which represents zero amplitude by a code word having a logical "0" in each of its bits. Indeed, numerous code arrangements could be utilized if required for suppressing echo code words without deviating from the invention.

What is claimed is:

1. A digital echo suppression gate which comprises,
storage means,
first means for supplying digital code words having a plurality of bits to said storage means,
means for transmitting the bits of said code words,
controllable means for transferring the bits of individual code words stored in said storage means to said transmitting means, said controllable means being responsive to inhibit the transfer of said stored code word bits in accordance with a pre-established criterion, and
second means for supplying digital signals having a predetermined logical state to said transmitting means when the transfer of said code word bits is inhibited.

2. A suppression gate as defined in claim 1 wherein said first supplying means includes means for converting serial code words having a plurality of bits into parallel code words and coupling means for controllably transferring said parallel code word bits to said storage means at predetermined instants.

3. An echo suppression gate as defined in claim 2 wherein said storage means has a plurality of stages, said serial-to-parallel converter means includes a first shift register having a plurality of stages, and said coupling means includes a plurality of AND gates, said AND gates being in a one-to-one circuit relationship with the stages of said storage means.

4. A suppression gate as defined in claim 1 wherein said transmitting means includes means for converting parallel code words to serial code words.

5. A suppression gate as defined in claim 4 wherein said storage means has a plurality of stages, said parallel-to-serial converter means includes a shift register having a plurality of stages, said controllable means includes a plurality of AND gates, said AND gates being in a one-to-one circuit relationship with individual stages of said storage means and individual stages of said shift register, and further including means for generating signals to control said AND gates.

6. A digital echo suppression gate which comprises,
storage means,
means for supplying digital code words having a plurality of bits to said storage means,
means for substituting digital signals having a predetermined logical state for the bits of individual code words stored in said storage means in accordance with a pre-established criterion, and
means for inhibiting the substitution of said predetermined digital signals for at least a selected one of the bits of said individual code words.

7. A digital echo suppression gate which comprises,
first shift register means having a plurality of stages,
first means for supplying digital code words having a plurality of bits to the stages of said first shift register means,
storage means having a plurality of stages,
means for transferring the bits of said code words from the stages of said first shift register means to the stages of said storage means at predetermined instants,
second shift register means having a plurality of stages, and
controllable means for transferring the bits of individual ones of said code words from the stages of said storage means to the stages of said second shift register means, said controllable means including means for inhibiting the transfer of said code word bits to said second register means and
second means for supplying digital signals having a predetermined logic state to the stages of said second shift register means when the transfer of said code word bits is inhibited.

8. A suppression gate as defined in claim 7 wherein said transferring means includes a plurality of AND gates, said AND gates being in a one-to-one relationship with the stages of said storage means.

9. An echo suppression gate as defined in claim 7 wherein said inhibiting means includes a plurality of AND gates, said AND gates being in a one-to-one circuit relationship with the stages of said second shift register means and the stages of said storage means, and means for generating signals at predetermined instants to control said AND gates.

10. A digital echo suppression gate as defined in claim 7 wherein said controllable means further includes means for allowing at least a selected one of the bits of said individual code words to transfer unaltered from said storage means to said second shift register means when the others of said bits are inhibited and wherein said second supplying means includes means for supplying digital signals having a predetermined logic state to said second shift register means for the others of said bits.

* * * * *